3,051,720
PRODUCTION OF PHTHALOCYANINE PIGMENTS

John W. Minnich, Wilmington, Del., assignor to E. I. du Pont de Nemours and Company, Wilmington, Del., a corporation of Delaware
No Drawing. Filed Dec. 29, 1958, Ser. No. 783,104
10 Claims. (Cl. 260—314.5)

This invention relates to a new process for obtaining phthalocyanine pigments in small particle size.

Phthalocyanine pigments are a well known class of coloring compounds. The copper phthalocyanines, particularly, find widespread use in the blue-to-green color range. These products have usually been prepared in either of two ways. In one method, the phthalocyanine is produced by reacting phthalonitrile with a metal salt, usually a copper chloride. This reaction may be carried out in a melt system without any diluent, or it may be carried out with the raw materials in suspension in an inert high boiling solvent such as kerosene or trichlorbenzene. In the second route, which also may be carried out in a melt or in suspension in inert solvents, phthalocyanine is produced by reacting phthalic anhydride with urea and a metal salt, such as a copper chloride.

One of the most widely used of the copper phthalocyanines is unsubstituted copper phthalocyanine which is a brilliant blue pigment. There are also available commercially substituted copper phthalocyanines wherein the substituents alter the properties and the hue of the pigment in a desired manner. For instance, a small amount of chlorine, usually introduced by adding a small amount of a suitably chlorinated phthalic anhydride derivative, confers crystal stability in certain organic solvents which tend to cause a change in crystal phase. Introduction of a small amount of a sulfonic acid group in the same general manner confers resistance to flocculation in coating composition vehicles. Substantially complete chlorination results in a brilliant green pigment.

The phthalocyanine products obtained from these well known methods of manufacture usually require substantial particle size reduction before acceptable pigmentary properties are attained. Various methods of reducing the particle size have been proposed and used in commercial operations. One of the first methods to be described in the art is known as acid pasting. In this method pigment is dissolved in a relatively large amount of concentrated sulfuric acid (or chlorsulfonic acid in the case of the polychloro phthalocyanine compounds), and then it is precipitated from this solution by rapid dilution with water. This is an effective method of particle size reduction, yet it has certain disadvantages. The use of a large amount of these very strong acids raises production costs, and there are problems involved in handling such large quantities of acid and water. Also, it has been the common experience of those who have used this method of particle size reduction that the products require special treatment during the drying operation in order to avoid agglomeration and a consequent loss of much of the advantage obtained by the acid pasting operation.

A modification of the acid pasting method, known as acid swelling, has also been used. In an acid swelling operation, concentration of the acid and the amount thereof are adjusted so that the pigment is not actually dissolved in the acid but appears to be affected by a sort of "swelling" of the crystals. It is possible that there is some formation of a sulfate of a phthalocyanine in this operation, but there is not sufficient acid nor a sufficient concentration of the acid to actually result in true solution. Nevertheless, on dilution of this mixture with water, the phthalocyanine is regenerated in its original chemical form in a smaller particle size than the original. Such a method is described in FIAT Report 1313 (PB-85172), vol. III, pages 298–303 and 442–448. According to this report, up to as much as 20 parts of acid per part of pigment are used, and the concentration of the acid is in the range of 60–80%. The process also requires a temperature of 35–40° C. and vigorous agitation for 14–20 hours. Experience has shown that this method, although reasonably successful, falls considerably short of modern quality standards in most cases. Moreover, the large amount of acid and the very long time required are undesirable features of this process.

The present invention concerns a process which preconditions phthalocyanine pigments prior to acid swelling. This preconditioning comprises dry milling the pigment in the absence of any milling aid in a milling apparatus having an attrition and shearing action. Because of this preconditioning, the ultimate product from the acid-swelling operation is found to possess far superior pigment properties. The results obtained by this preconditioning operation are quite surprising since in the past attempts to reduce the particle size of pigments by dry grinding in the absence of added agents have been without success. Moreover, such dry grinding failed to show any beneficial effect upon the pigment, and in some instances appeared to be detrimental.

For instance, when a crude copper phthalocyanine pigment is ground in the dry state in the absence of any added inert substance such as sodium chloride or borax, there is no evidence of any substantial reduction in particle size when examined by any of the tests usually applied to such pigments. There is no increase in tinctorial strength; rather, it is common to observe a marked decrease in strength. There is no improvement in intensity of color, nor is there any evidence of significantly smaller particle size by either microscopic observation or surface area measurements. These tendencies are particularly serious when the grinding is done in a ball mill; and it has even been observed that a small particle size copper phthalocyanine finished by other methods will revert largely to the properties of a crude pigment when subjected to dry grinding in a ball mill. The effect is not limited to ball mill grinding; it is observed to a lesser degree in other dry grinding methods, such as may be found in a hammer mill or even in a mortar and pestle. In short, all prior experience has led to the presumption that dry grinding is not an effective method for particle size reduction of phthalocyanine pigments.

In the process of this invention for the comminution of crude phthalocyanine pigments, the first step of dry milling in the absence of any milling aid is preferably carried out in ball mill. The milling is followed by the acid swelling operation and then the pigment and acid are drowned in water to regenerate the phthalocyanine in small particle size, and this product is recovered by conventional means. In a preferred embodiment of this invention, a phthalocyanine is dry ground for about 6 hours in a conventional manner in a ball mill in the absence of any grinding aid. After the discharge of the dry pigment from the mill, it is slurried in 3–4 parts of sulfuric acid of about 65–85% concentration, and after complete wetting, it is allowed to stand in contact with the acid for about one hour at about room temperature, e.g. in the range of 10–30° C. The slurry is then rapidly diluted with a relatively large amount of water, heated for a short time near the boiling point, and then filtered, washed free of soluble salts and dried in a conventional manner to give a pigment of superior tinctorial properties.

This preferred process can be used with any of the various forms of phthalocyanine. However, in the case of the polychloro phthalocyanine derivatives, the preferred acid concentration is increased to the range of 93–100% sulfuric acid.

For a clearer understanding of the invention, the following specific examples are given. These examples are intended to be merely illustrative of the invention and not in limitation thereof. Unless otherwise specified all parts are by weight.

*Example I*

18 parts of a substantially chlorine-free copper phthalocyanine pigment (obtained by the reaction at an elevated temperature of phthalic anhydride with urea and copper chloride in kerosene and in the presence of ammonium molybdate as a catalyst) is charged to a ball mill containing about 1000 parts of "Cyl-pebs" ("Cyl-pebs" are steel rods approximately 5/8" x 1"). The size of the mill is such that the full charge of pigment and "Cyl-pebs" occupies approximately 60-65% of the total volume of the mill. The mill is rotated at about 70% of the critical speed (the critical speed is that at which the centrifugal force overcomes the force of gravity so that the grinding elements are retained against the outer wall of the mill) for about 6 hours. The dry powder is discharged from the mill through a suitable screen. 15 parts of this dry powder is then mixed with 55 parts of 70% sulfuric acid using only sufficient agitation to completely wet the dry powder. Some heat is developed during this operation, but no added heat is necessary nor is any cooling necessary under normal circumstances. The mixture of acid and pigment is allowed to stand for about 1 hour after which 300 parts of cold water is added. Agitation is then commenced and the slurry is heated to the boil and stirred for about ½ hour at the boil. It is then filtered, washed free of soluble salts and the pigment is dried at 80° C. to give a red shade copper phthalocyanine pigment of superior tinctorial strength.

*Example II*

In this example the process is applied to a copper phthalocyanine pigment containing about 4.5% chlorine (obtained by the reaction at an elevated temperature of a suitable mixture of 4-chlor phthalic acid and phthalic anhydride with urea and copper chloride in kerosene and in the presence of ammonium molybdate as a catalyst). The milling operation for this chlorine-containing copper phthalocyanine is the same as that shown in the first part of Example I, except that it is carried out for only 4 hours instead of 6 hours. 15 parts of the resulting dry powder is then mixed with 40 parts of 80% sulfuric acid and the mixture is allowed to stand for 1 hour, after which 1000 parts of water is added. Agitation is then commenced and the slurry is heated to the boil, boiled for about ½ hour and the pigment isolated by filtering. It is then washed free of soluble salts and dried at 80° C. to give a pigment possessing good tinctorial strength, excellent intensity, and the characteristic crystal stability of such chlorine-containing products.

*Example III*

The pigment of this example is a flocculation resistant copper phthalocyanine containing both chlorine and sulfonic acid groups. It is made substantially as described in U.S. 2,799,594 by reacting at an elevated temperature a suitable mixture of 4-sulfophthalic acid, 4-chlorophthalic acid and phthalic anhydride with urea and copper chloride in kerosene and in the presence of ammonium molybdate as a catalyst. The milling operation is carried out as described in Example I except that it is continued for about 18 hours. 25 parts of the resulting dry powder is mixed with 90 parts of 80% sulfuric acid and allowed to stand for 1 hour and then diluted with 1000 parts of water. Agitation is then commenced and the slurry is heated to the boil and stirred about ½ hour at the boil. The pigment is recovered from the slurry, washed substantially free of soluble salts, and dried at about 80° C. to give a crystal-stable, flocculation-resistant pigment of good tinctorial strength. If desired, the filter cake from the acid swelling step may be converted to a rosinated lake by conventional techniques. This practice is sometimes followed with phthalocyanines containing sulfonic acid groups since this overcomes the tendency for the pigment to become hard upon drying. The lakes usually contain 30-40% rosinate and 60-70% phthalocyanine pigment.

*Example IV*

The pigment in this example is a commercial polychloro copper phthalocyanine pigment containing about 14.5 atoms of chlorine per molecule. (Commercial polychloro copper phthalocyanines usually analyze less than 16 atoms of chlorine which is the theoretical for complete chlorination.) 18 parts of this pigment is charged to a ball mill containing about 1000 parts of "Cyl-pebs." The size of the mill is such that the full charge of pigment and "Cyl-pebs" occupies approximately 60-65% of the total volume of the mill. The mill is rotated at about 70% of the critical speed for about 5 hours. 25 parts of the resulting dry powder is then mixed with 100 parts of sulfuric acid of 95.5% concentration. After standing for about 1 hour at room temperature, 1000 parts of water is added to the mixture. Agitation is then commenced and the mixture is heated to the boil and held at this temperature for about ½ hour while stirring. The pigment is then isolated by filtering, washed substantially free of soluble salts, and dried at about 80° C. to give a brilliant green pigment of good tinctorial strength and intensity.

*Example V*

A 1000 gal. ball mill, approximating 6' in length by 6' in diameter, is charged with approximately 24,000 lbs. of 5/8" x 1" "Cyl-pebs" together with about 3000 lbs. of common railroad spikes (these are introduced to prevent any caking in the mill). 1200 lbs. of a chlorine-free copper phthalocyanine substantially identical with that used in Example I is then added to the mill and it is operated at about 70% of critical speed for about 6 hrs. after which the dry powder is discharged from the mill through a suitable screen to retain the grinding elements in the mill.

50 parts of water is then added to a separate container arranged for simple agitation and 138 parts of 96% sulfuric acid is added thereto with careful agitation to give approximately 70% concentration of $H_2SO_4$ in the solution which is then cooled to below 30° C. At this point, 50 parts of the dry powder from the milling operation above is added to the acid solution and the agitation is continued until the dry powder is all wet after which the agitation is discontinued and the mixture is allowed to stand without agitation for about 1 hr. 1000 parts of water is then added rapidly. The agitation is then started, and the mixture is heated to the boil and held there for about ½ hr. with the agitator still running. The slurry is then filtered, washed substantially free of soluble salts and substantially free of acid and finally dried at 80° C. to give a red shade copper phthalocyanine pigment of superior tinctorial properties.

In the examples above, the process of this invention has been shown to have utility in the particle size reduction of various copper phthalocyanine pigments including copper phthalocyanine per se, the partially chlorinated and the substantially chorinated species, and also copper phthalocyanine containing other substituents such as the sulfonic acid group. The process of this invention is also applicable to the particle size reduction of metal-free phthalocyanine and metal phthalocyanines other than copper phthalocyanine. For example, nickel phthalocyanine, cobalt phthalocyanine, aluminum phthalocyanine, iron phthalocyanine and also the corresponding partially chlorinated or substantially chlorinated derivatives can be reduced in particle size. Likewise, it is applicable to mixtures of these products, especially to mixtures of copper phthalocyanine with other metal phthalocyanines and with various substituted phthalocyanines, such as halogenated and sulfonated species.

It is well known in the art that unsubstituted copper phthalocyanine is capable of existing in two crystal phases—one of these phases is a reddish shade of blue, while the other is a greenish shade of blue. Although there is some confusion in the pigment art as to the designation of these two crystal phases, the most widely accepted nomenclature refers to the phase possessing the reddish shade as the alpha crystal phase (see FIAT Report 1313, vol. III) and the phase possessing the greenish shade as the beta crystal phase (see U.S. Patent 2,556,726). When the present invention is applied to unsubstituted CPC, the ultimate product will always be the reddish shade product which is in the alpha crystal phase.

The conditions applicable to the dry milling operation which is the first step in this process are not especially critical. The mill loading is substantially conventional for ball milling operations. Thus, it is conventional for the charge of grinding media to occupy something less than ½ of the volume of the mill and for the material being ground to occupy considerably more than the voids between these media so that the total charge in the mill is in the range of 60–65% of the total volume of the mill. It is quite possible to increase the charge to the range of about 75% of the volume of the mill with some increase in the milling time. The choice of these conditions is well within the skill of one versed in this type of operation. The preferred grinding media in the mills are the rod type "Cyl-pebs" described above in Example I, and these may vary in size. It is also possible to use ordinary round steel balls varying from ⅛" in diameter up to ½" in diameter or more. When round balls are used, there is a tendency for the charge to cake in the mill under some conditions. Such caking is often avoided by the use of some irregularly shaped grinding media, such as nails. The use of the rod type "Cyl-pebs" usually obviates this difficulty. As already pointed out, the optimum time of grinding will vary somewhat with the mill loading and, also to some degree with the type of pigment being milled. A minimum of 4–6 hours is usually required and this may be extended to as much as 12–18 hours. It is characteristic of this operation and one of the unexpected features that the dry powder obtained following the milling step shows no significant improvement with respect to ordinary pigment properties over the original crude pigment. It is only when the subsequent acid swelling step is applied to this powder that its improved properties become apparent.

Although the preferred method of dry milling is in a ball mill, any type of milling or grinding apparatus in which the grinding action is due to attrition or shearing action as distinguished from impact action may be used. Grinding apparatus having an impact action, such as a pulverizer or micronizer, produce inferior results. On the other hand, rod mills as well as stirred and vibratory types of ball mills in contrast to the usual rotating type are additional examples of grinding equipment having an attrition or shearing action on the pigment.

In the acid swelling step of this invention, there are certain broad limits which are applicable with preferred ranges of special value. Thus, the concentration of the sulfuric acid may range from about 50% to about 100%. Within this range 65–85% concentration is preferred for the copper phthalocyanine blue pigments and about 93–95% for the polychloro derivatives. Therefore, the preferred acid concentration range which includes both the copper phthalocyanine blue pigments and the polychloro derivatives is 65%–95%. Within the broader range excellent products are obtained, but the preferred ranges give the optimum products.

The amount of acid may vary from about 2 parts per part of pigment up to about 12 parts per part of pigment, these figures being based upon the total amount of acid solution used regardless of its concentration. Within this range, 3–4 parts of acid per part of pigment give entirely satisfactory results and are preferred for reasons of economy over the larger amounts.

With respect to the temperature during the acid swelling step, it is common to start with the acid at a temperature of 10° C.–30° C. Heating up to as much as 50° C.–60° C. or cooling below 10° C. would do no harm to the process but does not offer any advantage and consequently is not a preferred step.

The degree of agitation required for the acid swelling step is one point of clear distinction over the prior art which has suggested a similar operation requiring a shearing action. It is found in this process that the only agitation required is that necessary to completely wet the pigment with the liquid. It is usual to continue the agitation only so long as required to wet the pigment and then to allow the material to digest simply by standing for a time in the range of about 1 hour. However, the digestion time may be considerably less, e.g. as little as 5 minutes, and it may extend to a much longer period such as 24 hours without any significant variation in the final results.

The regeneration of the pigment by dilution with water is entirely conventional and the only requirement is that there is sufficient water to hydrolyze any phthalocyanine sulfate formed as a result of contacting the pigment with the sulfuric acid. Usually, dilution to an acid concentration of 10–30% is sufficient to accomplish this, but it may vary outside these limits depending upon the particular conditions being used. It is common to heat the diluted mixture to the boil to promote hydrolysis and to improve the efficiency of the acid extraction step. Although preferred, it is not an essential step in the new process.

The two-step process of this invention offers a significant advantage over the one-step acid swelling operations of the prior art since it produces products of markedly superior tinctorial properties without using special equipment or large amounts of acid. The process of this invention is especially advantageous for the preparation of a red shade, chlorine-free copper phthalocyanine as shown in Example I. Such products have outstanding tinctorial properties and the process shows substantial economic advantages as compared with other means for producing products of similar tinctorial properties.

Since it is obvious that many changes and modifications can be made in the above-described details without departing from the nature and spirit of the invention, it is to be understood that the invention is not to be limited to said details except as set forth in the appended claims.

I claim:

1. A process for the comminution of a phthalocyanine pigment which comprises dry milling said pigment in a milling apparatus having an attrition and shearing action, subsequently acid swelling said dry-milled pigment, and recovering a finished phthalocyanine pigment product.

2. A process according to claim 1 in which said dry milling step is conducted in a ball mill.

3. A process for the comminution of a phthalocyanine pigment which comprises dry milling said pigment in a ball mill, contacting said dry-milled pigment with from 2–12 parts of sulfuric acid per part of pigment, said sulfuric acid having a concentration of from 50–100%, adding sufficient water to hydrolyze the copper phthalocyanine sulfate formed as a result of contact with the $H_2SO_4$, and recovering the finished phthalocyanine pigment product.

4. A process according to claim 3 in which there are 3–4 parts of sulfuric acid per part of pigment and the concentration of the acid is from 65–95%.

5. A process for the comminution of a phthalocyanine pigment selected from the group consisting of the substituted and unsubstituted copper phthalocyanines, nickel phthalocyanines, cobalt phthalocyanines, aluminum phthalocyanines, iron phthalocyanines, and mixtures thereof, which comprises dry milling said pigment in a ball mill, contacting said dry-milled pigment with from 2–12 parts of sulfuric acid per part of pigment, said sulfuric acid having a concentration of from 50–100%, adding sufficient water to hydrolyze the copper phthalocyanine sulfate formed as a result of contact with the $H_2SO_4$, and recovering the finished phthalocyanine pigment product.

6. The process of claim 5 in which the phthalocyanine is chlorine-free copper phthalocyanine.

7. The process of claim 6 in which there are 3–4 parts of sulfuric acid per part of pigment and the concentration of the acid is from 65–85%.

8. The process of claim 5 in which the phthalocyanine is copper phthalocyanine analyzing about 4.5% chlorine and the concentration of the sulfuric acid is about 80%.

9. The process of claim 5 in which the phthalocyanine is copper phthalocyanine substituted with chlorine and sulfonic acid groups and the concentration of the sulfuric acid is about 80%.

10. The process of claim 5 in which the phthalocyanine is polychloro copper phthalocyanine analyzing about 14.5 atoms of chlorine per molecule and the concentration of the sulfuric acid is about 95%.

References Cited in the file of this patent

UNITED STATES PATENTS

| | | |
|---|---|---|
| 2,284,685 | Detrick et al. | June 2, 1942 |
| 2,716,649 | Brouillard | Aug. 30, 1955 |
| 2,770,629 | Eastes | Nov. 13, 1956 |
| 2,857,400 | Cooper | Oct. 21, 1958 |

FOREIGN PATENTS

| | | |
|---|---|---|
| 503,666 | Great Britain | Apr. 12, 1939 |